United States Patent [19]
Dent

[11] Patent Number: 5,826,173
[45] Date of Patent: Oct. 20, 1998

[54] EFFICIENT PAGING SYSTEM WITH SLEEP MODE DURATION DETERMINED BY THE GUARANTEED NUMBER OF REPEATS

[75] Inventor: Paul W. Dent, Stehags, Sweden

[73] Assignee: Ericsson Inc., Research Triangle Park, N.C.

[21] Appl. No.: 559,458

[22] Filed: Nov. 15, 1995

Related U.S. Application Data

[62] Division of Ser. No. 305,652, Sep. 14, 1994.

[51] Int. Cl.⁶ .............................. H04M 11/00; G08B 5/22
[52] U.S. Cl. .................... 455/38.3; 455/458; 340/825.44
[58] Field of Search .................................. 379/58, 63, 60; 370/95.1, 95.2; 455/574, 572, 573, 458, 422, 426, 38.3; 340/825.44

[56] References Cited

U.S. PATENT DOCUMENTS

| | | |
|---|---|---|
| 4,613,990 | 9/1986 | Halpern . |
| 5,023,932 | 6/1991 | Wakana ................................ 455/455 X |
| 5,039,984 | 8/1991 | Andros et al. . |
| 5,091,942 | 2/1992 | Dent . |
| 5,128,938 | 7/1992 | Borras ..................................... 370/95.1 |
| 5,129,095 | 7/1992 | Davis et al. . |
| 5,152,006 | 9/1992 | Klaus ...................................... 455/574 |
| 5,237,603 | 8/1993 | Yamagata et al. ......................... 379/61 |
| 5,276,680 | 1/1994 | Messenger ............................. 379/60 X |
| 5,276,907 | 1/1994 | Meidan . |
| 5,301,225 | 4/1994 | Suzuki et al. . |
| 5,303,286 | 4/1994 | Wiederman ............................... 379/57 |
| 5,345,500 | 9/1994 | Breeden et al. . |
| 5,355,516 | 10/1994 | Herold et al. ............................ 455/510 |
| 5,369,681 | 11/1994 | Boudreau et al. . |
| 5,428,820 | 6/1995 | Okada et al. ........................... 455/38.3 |
| 5,440,560 | 8/1995 | Rypinski ................................ 370/95.2 |
| 5,448,762 | 9/1995 | Ward . |
| 5,459,457 | 10/1995 | Sharpe ................................ 370/311 X |
| 5,487,181 | 1/1996 | Dailey et al. .............................. 455/89 |
| 5,539,748 | 7/1996 | Raith ...................................... 370/95.1 |
| 5,546,394 | 8/1996 | Eaton et al ............................. 370/347 |
| 5,548,250 | 8/1996 | Fang ......................................... 331/14 |
| 5,566,366 | 10/1996 | Russo et al. ........................... 455/54.1 |
| 5,577,046 | 11/1996 | Diachina et al. .................... 370/346 X |
| 5,590,396 | 12/1996 | Henry ................................. 455/38.3 X |
| 5,604,744 | 2/1997 | Anderson et al. ...................... 370/347 |

FOREIGN PATENT DOCUMENTS

| | | |
|---|---|---|
| 408 086 A2 | 1/1991 | European Pat. Off. . |
| 408 086 A3 | 1/1991 | European Pat. Off. . |
| 627 836 A2 | 12/1994 | European Pat. Off. . |
| 642 234 A1 | 3/1995 | European Pat. Off. . |
| 695 101 A1 | 1/1996 | European Pat. Off. . |
| 2 115 195 | 9/1983 | United Kingdom . |
| 2 253 972 | 9/1992 | United Kingdom . |
| WO89/05009 | 6/1969 | WIPO . |
| WO93/23964 | 11/1993 | WIPO . |
| WO94/08420 | 4/1994 | WIPO . |
| WO94/19879 | 9/1994 | WIPO . |
| WO95/21507 | 8/1995 | WIPO . |

*Primary Examiner*—David R. Hudspeth
*Assistant Examiner*—Scott Richardson
*Attorney, Agent, or Firm*—Burns, Doane, Swecker & Mathis, L.L.P.

[57] ABSTRACT

A method for efficiently paging a mobile phone in a radio communication system having a plurality of mobile phones is disclosed. A first paging signal is transmitted for a mobile phone on a first try channel. If the mobile phone does not acknowledge the first paging signal within a predetermined period of time, the call is transferred to at least a second try channel. A second paging signal is then transmitted for the first mobile phone on at least the second channel.

28 Claims, 8 Drawing Sheets

EFFICIENT PAGING SYSTEM WITH SLEEP MODE DURATION DETERMINED BY THE GUARANTEED NUMBER OF REPEATS

This application is a divisional, of application Ser. No. 08/305,652, filed Sep. 14, 1994.

FIELD OF THE INVENTION

The present invention relates to the provision of an efficient calling channel, also known as a control channel or paging channel, in a radio telephone system, and more particularly to improving the capacity and performance of the calling channel.

BACKGROUND OF THE INVENTION

In a radio telephone system such as a cellular phone system or a satellite communication system serving a large number of subscribers, or in a hybrid system serving dual mode cellular/satellite portable phones, a calling channel is used to alert a subscriber to an incoming call. The calling channel in a reverse direction is used by the portable phone to reply to a call originated by the cellular network. The reverse calling channel, sometimes known as the random access channel, is also used by portable phones to place calls which they originate. In this case, the forward control channel is used by the network to grant the requested call access to the system by issuing a traffic channel allocation to the portable telephone.

Figure 1:
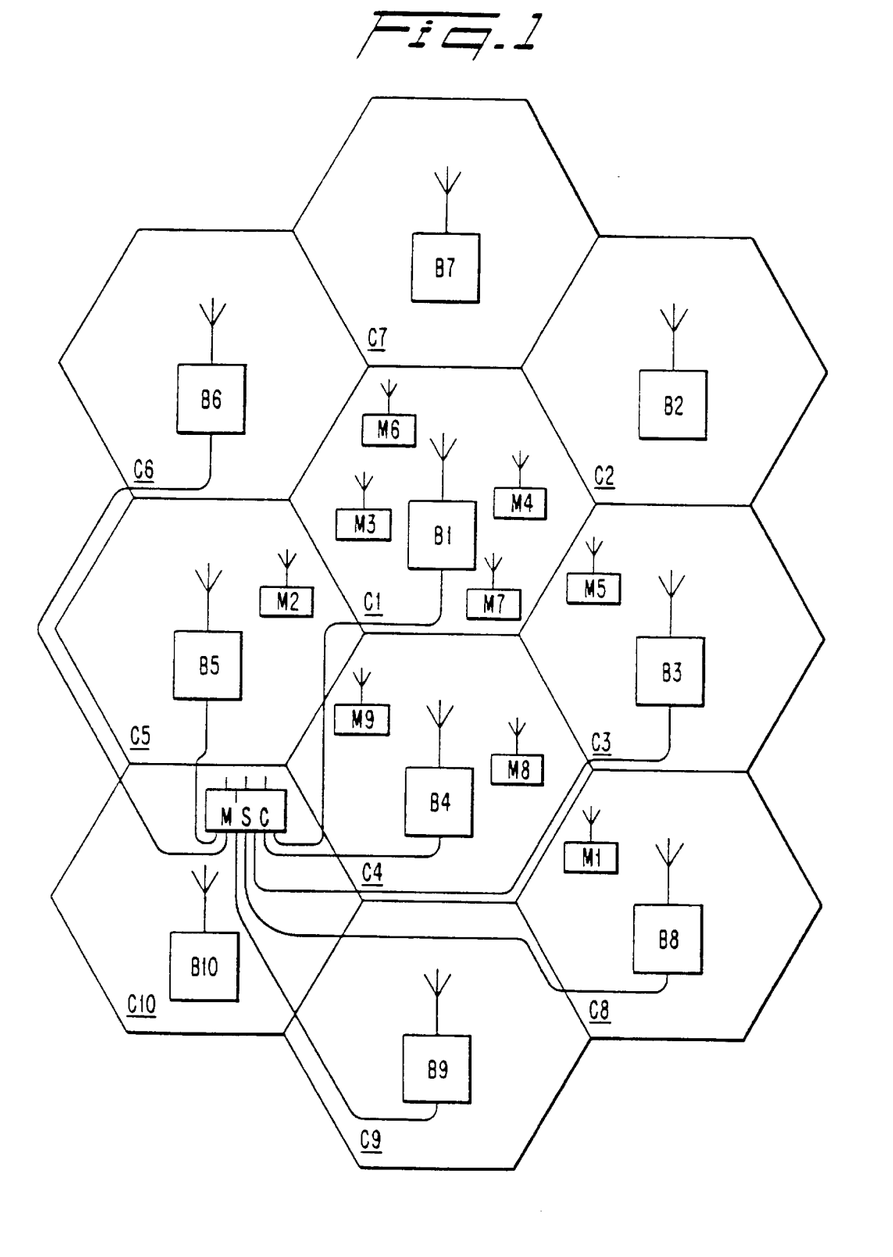
FIG. 1 illustrates a typical cellular phone system.

FIG. 1 illustrates 10 cells, C1–C10, of a cellular mobile radio system. For each cell, there is a corresponding base station, B1–B10. The base stations are situated in the center of the cells and have omni-directional antennas. Mobile stations M1–M10 are also shown. The mobile stations may be small lightweight battery powered portable telephones or more bulky vehicle installed telephones which are powered by the vehicles electric power system. The mobile stations may be moved within a cell and from one cell to another. A mobile switching center (MSC) is connected to all of the base stations by cables or any other fixed means, like a radio link. Some of these cables or means are omitted from the figure for simplicity. The MSC is also connected by cables or links to a fixed public telephone network or a similar fixed communication network.

During operation, the mobile station is in contact with the fixed part of the radio system by transmission of radio signals to and reception of radio signals from the different base stations. Telephone calls, data communication links or other communication paths may be set up between a first mobile station and a second mobile station in the system. Telephone calls may also be set up with mobiles in another mobile radio system or with subscribers to the fixed public telephone network. For the purpose of this application, such telephone calls and data communication links are all called connections irrespective of whether they originate in the mobile station or end in a mobile station.

FIG. 1 does not illustrate a complete normal mobile radio communication system but rather only part of a mobile radio communication system. Normally such a mobile radio communication system will comprise more cells and base stations than the 10 cells and base stations illustrated in FIG. 1. In addition, the number of mobile stations will normally be much larger. Some cells of a cellular system may also be served by more than one base station. A complete cellular mobile radio system may also include more MSCs with connected base stations and the mobile stations are usually free to communicate via these additional base stations. In some systems, the base stations are not connected directly to the MSC but rather to a base station controller BSC. In this type of system, a plurality of base stations can be connected to one BSC. A plurality of BSCs are then connected to a mobile switching center.

In FIG. 1, all of the cells have the same hexagonal shape and the same size. Cells therefore, which are not located on the boundary of the radio system, have six adjacent cells, e.g., cell 1 has adjacent cells C2–C7. In practice, cells may have different shapes and are not limited to the hexagonal shape illustrated in FIG. 1. Cells surrounded by other cells may then have more or less than six adjacent cells. In addition, a complete cellular system may also have some larger umbrella cells each covering an area also covered by a group of smaller cells. Base stations located in the vicinity of the cell borders and with sector antennas are also known in the art.

In a system illustrated in FIG. 1, it is desirable that the vast majority of call attempts be successful, for example, 99.9%. Unfortunately, transmission errors can arise that impede a mobile phone or a network from correctly recognizing a call. This can be alleviated by the use of error correction coding in the transmitted signal so that coded calls can be recognized even when transmission errors occur. However, error correction coding expands the general capacity utilized to make each call attempt which in turn reduces the capacity of the calling channel. In addition, no amount of error correction coding per se can overcome the failure of a mobile phone to respond to a call because the mobile phone is temporarily shadowed from the transmitter while passing under a bridge or past a tall building. Therefore, it is necessary to supplement more sophisticated forms of error correction coding with a simple procedure of repeating the call signal after a suitable delay. However, the capacity of the radio system does not normally allow for more than one or two repeats, and timing difficulties in prior art system generally result in the transmission of repeats whether they are needed or not. For example, the U.S. AMPS cellular system transmits five calling message repeats for every call regardless if its answered on the first or second try. Similarly, prior art systems employ error correction coding whether or not the coding is needed for a particular mobile station.

SUMMARY OF THE DISCLOSURE

It is an object of the present invention to provide a method for efficiently paging a mobile phone in a radio communication system having a plurality of mobile phones. According to the present invention, a first paging signal is transmitted for a mobile phone on a first try channel. If the mobile phone does not acknowledge the first paging signal within a predetermined period of time, the call is transferred to at least a second try channel. A second paging signal is then transmitted for the first mobile phone on at least the second channel.

It is another object of the present invention to provide a method for paging a mobile phone in a radio communication system having a plurality of mobile phones wherein the mobile phones are in a reduced power sleep mode when they are idle. According to one embodiment of the present invention, the mobile phone wakes up at an assigned interval to receive data which is broadcast on an assigned first try sleep mode time slot. The mobile phone then decodes the received data. If the data is correctly decoded but is for another mobile phone, the mobile phone adopts a low power sleep mode until its next assigned sleep mode time slot. However, if the received data is not correctly decoded, the mobile station wakes up to receive data broadcast on a second time slot.

BRIEF DESCRIPTION OF THE DRAWINGS

These and other features and advantages of the present invention will be readily apparent to one of ordinary skill in the art from the following written description, used in conjunction with the drawings, in which.

DETAILED DESCRIPTION OF THE PREFERRED EMBODIMENTS

The present invention applies to radiotelephone systems such as cellular phone systems or a satellite communication system or a hybrid system serving dual mode cellular/satellite portable phones or any other radiotelephone system.

The present invention is particularly advantageous when a high percentage of mobile phones, perhaps 90%, will receive a call on the first attempt even with little or no error correction coding. Thus, according to one embodiment of the present invention, first call attempts are transmitted from the network with little or no error correction coding in the signal. In addition, the signal is not repeatedly transmitted for the majority of mobiles that reply within a predetermined period of time which may range from but is not limited to 0.5 to 2 seconds.

Figure 2:
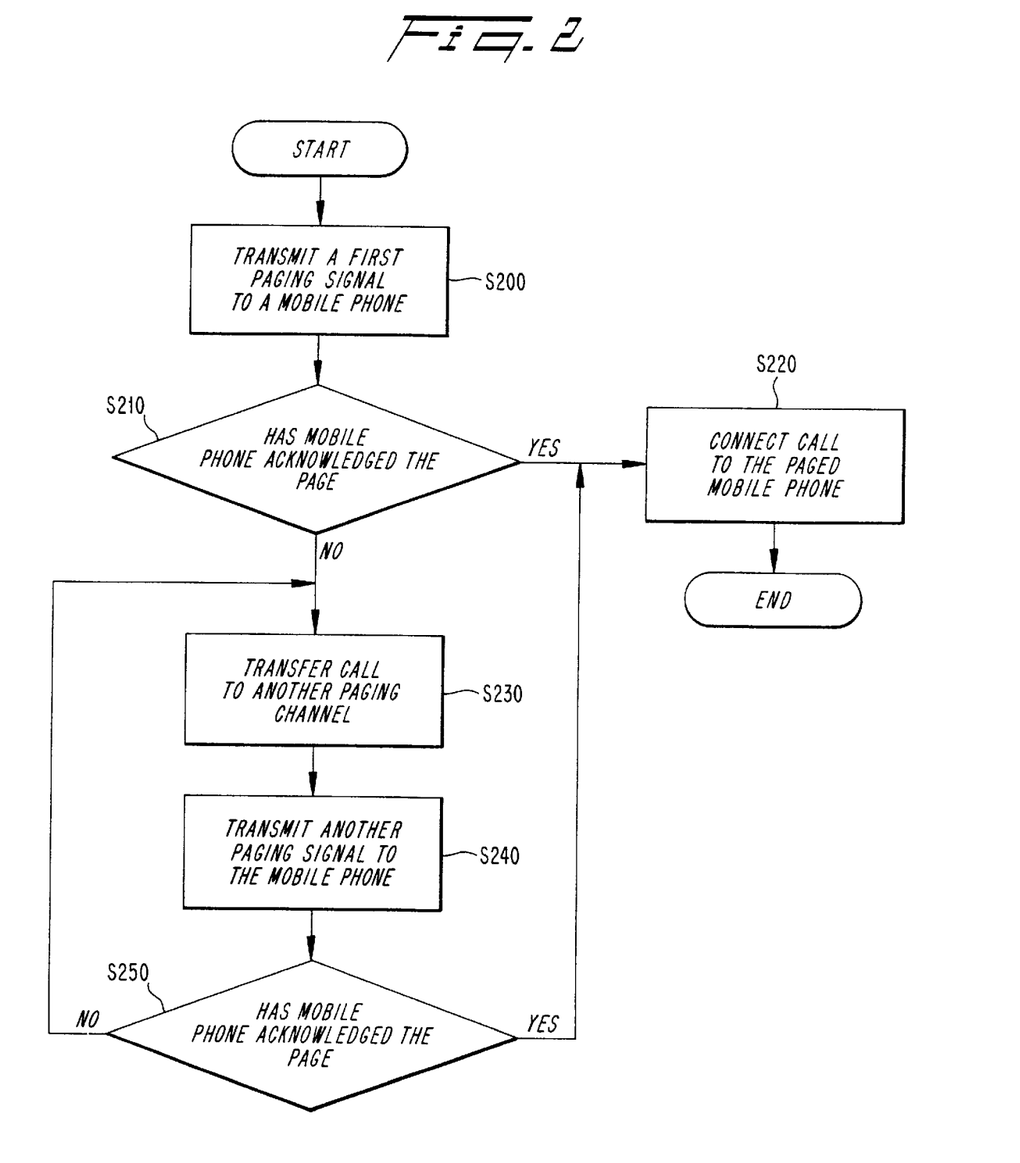
FIG. 2 is a flow chart representation of one embodiment of the present invention.

A method for efficiently using the calling channel will now be described in more detail in connection with FIG. 2. A call signal is first transmitted on the calling channel in step S200. If the mobile phone acknowledges the transmitted signal, in step S210, the system connects the call to the paged mobile phone in step S220. However, if the mobile phone does not acknowledge the transmitted page signal within a predetermined period of time in step S210, the call is transferred to another calling channel, i.e., a second try channel, in step S230. The paging signal is then transmitted on the second try channel in step S240. If the mobile station acknowledges the paging signal on the second try channel, in step S250, the system connects the call to the mobile phone in step S220. However, if the mobile phone does not acknowledge the paging signal on the second try channel, the call is transferred to another channel which transmits another paging signal for the mobile station. This procedure can be repeated on more channels if the mobile station does not acknowledge the paging signal on the third try channel.

The second try channel only needs approximately 10% of the capacity of the first try channel, given the 90% chance of first time success. These numbers are exemplary and are not meant to restrict the present invention. For example, if two attempts are required to even reach the 90% success level, then that pair of attempts is regarded as the first try and assignment of the call to the second try channel would only take place if the first pair of call attempts fails.

The second try channel can, if necessary, employ more error correction coding under the premise that a frequent reason for first try failures is a low signal-to-noise ratio. The second try channel could alternatively or additionally employ a higher transmission power. The second try channel could also broadcast the call over a wider area under the premise that another frequent reason for first try failures is that the mobile phone in question has moved out of the immediate calling area without re-registering in a new area. Furthermore, each successive level of next try channels, i.e., 3rd, 4th, etc. . . . , can use an increasing amount of error correction coding and/or a higher transmission level.

Another embodiment of the present invention broadcasts a second try in the original calling area using additional error correction coding, while using no extra coding in an expanded calling area. The exact mix of these options would be tailored to a particular system with knowledge of prior call failure statistics, and all such variations are considered to fall within the scope and spirit of this invention.

Battery operated hand-held portable phones are winning an increasing share of the mobile phone market as technology brings down their size and cost. Battery life is a critical competitive parameter in these portable phones and it is becoming increasingly common to include features in the calling channel signal and format to improve the battery life of the portable phones. The portable phones must of course spend all of its idle time listening for calls from the cellular network, so it is of paramount importance to minimize the battery energy consumed during this period. A known technique to minimize the battery energy consumed is to assign calls to a particular group of mobiles, distinguished, for example, by the last digit of the their phone numbers, to take place only in designated time slots in the calling channel broadcast structure. First, the cellular network divides a repetitive frame period into a number of sleep mode slots. Then, calls to mobile phones whose telephone number ends in "0" go out only in a first time slot while calls to mobile phones whose telephone number ends in "1" only use a second time slot, and so on. A particular mobile phone knows in which time slot it must wake up to receive a call. As a result, the mobile phone can reduce its power consumption by entering a sleep mode for the majority of the time. According to one embodiment of the present invention, the transmission of the calling message is repeated a plurality of times as determined by system loading and available capacity to transmit such calls. In addition, the cellular network transmits an indication of the number of repeats that are currently permitted. By knowing the number of repeats, a mobile phone can determine how many repeats may be skipped in order to save power in situations in which the first repeat was received.

Figure 9:
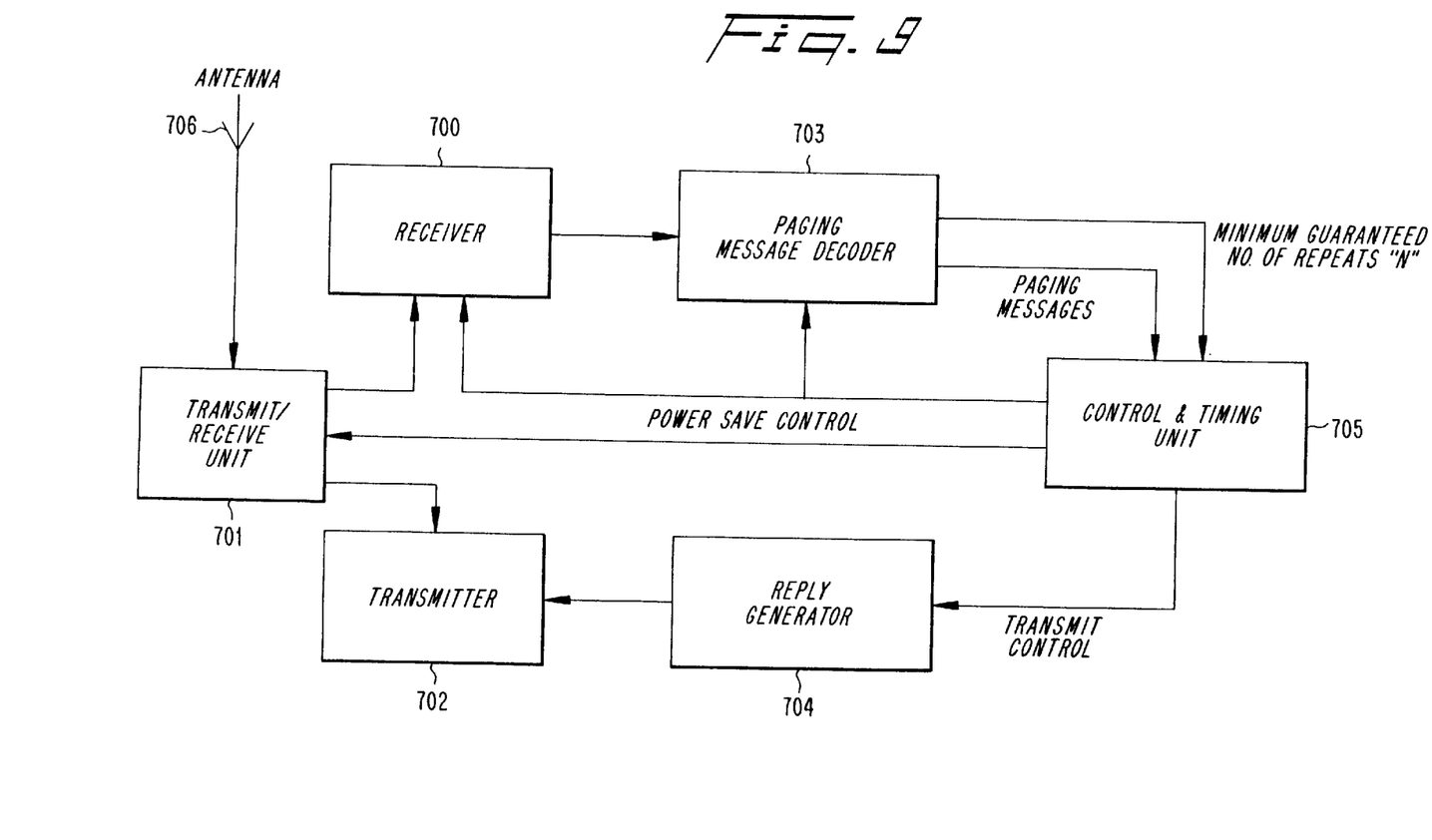
FIG. 9 illustrates a mobile phone having a normal and a reduced-power idle mode.

A block diagram of a switchable mobile phone is illustrated in FIG. 9. An antenna 706 is shared between a receiver 700 and a transmitter 702 with the aid of a transmit/receive unit 701. This may be a duplex filter or a T/R switch, which in the latter case would be controlled by a control unit 705 to effect transmission or reception. The output from the receiver 700 is connected to a decoder 703. The decoder 703 determines how many repeats the system is currently guaranteeing and informs the control unit 705. The control unit 705 controls the power on/off timing of the receiver/decoder circuits 700,703 so as to minimize power during periods of low activity taking into account the number of call repeats the system is using. If the activity is high, the control unit will cause the receiver/decoder (700,703) to wake up to receive all paging message repeats.

Thus, if paging the mobile begins early, the mobile will receive the early page and has a chance of making an early reply, thus terminating the repeats early. This can under favorable conditions result in the system being able to fit in more paging calls within the limited channel capacity.

If the mobile activity is low, a second lower-power sleep mode will be adopted by the control unit 705, which will then power up the receiver/decoder (700,703) only for every $N^{th}$ message transmitted in the mobile sleep mode slot. The mobile is programmed then to wake up on the first of the guaranteed minimum N of repeats, even if the system has started to page the mobile earlier. If the first repeat of a message is received correctly and the message is not for the mobile in question, the mobile will be powered down for the remainder of the N repeat periods. If however, the call is for the mobile in question, the control unit 705 will cause a reply to be generated by the reply generator 704 and transmitted by the transmitter 702 at the next reply opportunity.

In this embodiment of the present invention, the frame includes a frame marker for identifying a first slot and subsequent slots in the frame. In addition, the frame marker can be a timeslot which is used for broadcasting information to all portable telephones in the cellular network. The broadcast information can include details of surrounding base stations used for transmitting calls. The details can include but are not limited to surrounding base station frequencies, paging timeslots and base station ID codes, and even the location of the base station. The broadcast information can also include an infrequently changed random number used in an authentication algorithm to verify authenticity of mobile phones attempting to communicate with the cellular system, as for example disclosed in U.S. Patent application Ser. No. 07/655,771 and U.S. Pat. No. 5,091,942 both of which are incorporated herein by reference.

Figure 4:
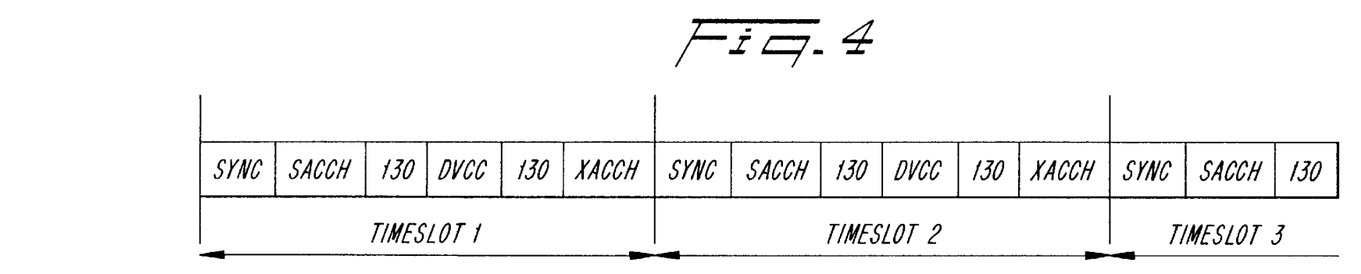
FIG. 4 illustrates a TDM transmission format.

To ensure that decoding is not prematurely terminated without having received broadcast information that the mobile phone needs, it is desirable either that the broadcast information bit-block be encoded and transmitted first, or that a separate encoding and decoding process be provided for these bits. A suitable TDM transmission format for the latter case is used in the U.S. digital cellular system standard IS54 and is illustrated in FIG. 4. The TDM frame consists of three identical subframes or timeslots that form a continuous transmission. Between each timeslot there are 12 bits transmitted that are presently spare. Each slot otherwise begins with a known 28-bit symbol pattern used for synchronization and equalizer training, followed by a 12-bit field known as the Slow Associated Control Channel (SACCH) and 260 information bits located in two blocks of 130 bits each surrounding the 12-bit Coded Digital Voice Color Code (CDVCC). In the IS54 system, the 130+130 information bits are described as containing either coded digital voice data or quarter rate, convolutionally encoded messages called the Fast Associated Control Channel (FACCH). In order to implement the present invention in such a digital cellular system, this format can be adopted unchanged by redefining the 130+130 bit information to be quarter rate convolutionally encoded calling messages using the same coding as the FACCH. The SACCH field is used to convey the broadcast information using the separate SACCH interleaving and coding scheme, and the CDVCC field is used to identify the sleep mode group each TDMA frame/slot belongs to.

Figure 5:
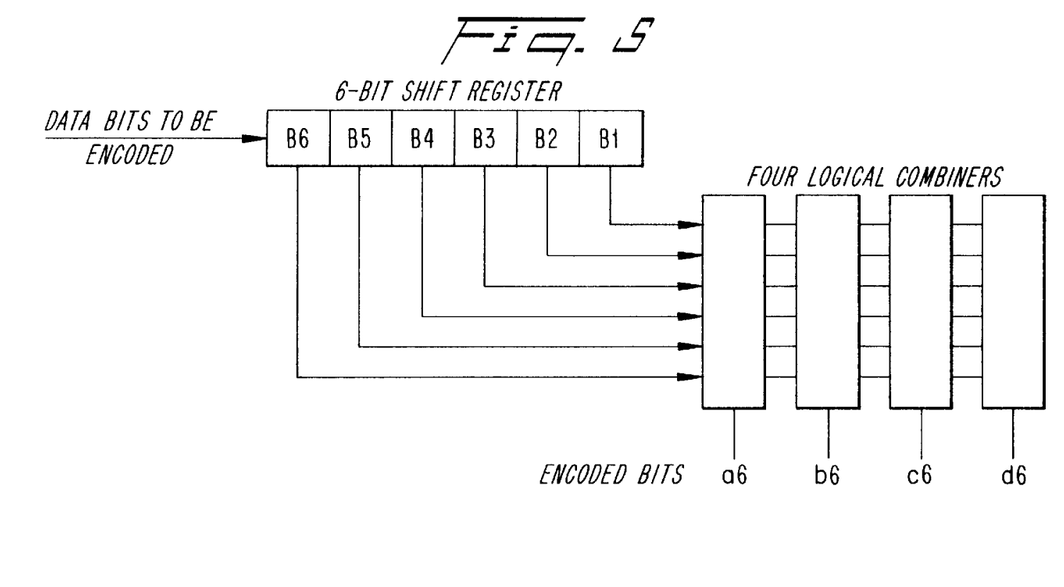
FIG. 5 illustrates a conventional convolutional encoder.

The FACCH coding is known as convolutional encoding with tail-biting. The term tail-biting refers to the means of initiating and terminating the decoding of a message. Referring to the convolutional encoder illustrated in FIG. 5, it can be seen that the encoder's shift register must contain 6 bits at all times in order to generate valid coded bits. One way of ensuring that the shift register contains 6 bits is to initialize the encoder with zeros, or at least 5 known bits and the first bit to be encoded. After extracting four coded bits, a new data bit must travel all the way through all six shift register positions, so that five known bits are shifted in, in order to flush the last data bit through. This results in the number of coded bits generated being 4N+20 where N is the number of data bits encoded.

In the tail-biting approach, the shift register is initialized with the first six bits to be encoded. Groups of four coded bits are extracted and then a new data bit is shifted in. Finally, when all data bits have been used, the first five data bits are used once more to flush the last bit through. In this way, the first five bits occupy every position in the shift register, either at the beginning or the end, and so they get the chance to affect as many coded bits as other data bits. This process may be regarded as starting with a ring of N bits and transforming it into a ring of 4N bits. It will be seen that the same ring of 4N bits is produced, apart from a rotation, wherever one starts the process in the ring of N data bits. Likewise, the decoding of the ring of 4N coded bits back to a ring of N bits can start anywhere in the circle. This approach avoids wasting 20 coded bits for initializing and terminating the coder/decoder. Consequently, the 260 coded bits transmitted decode to precisely ¼ that number, i.e., 65 data bits.

The 65 bit decoded message must convey at least the 34-bit Mobile Identification Number (MIN) of the mobile phone being called. Ten bits may be used to define one of the many frequency channels that the portable phone can use to reply to the call, and two bits may be used to specify whether timeslots 1,2 or 3 of a IDMA channel shall be used or whether the channel is a FDMA channel. Of the 19 remaining bits, 12 to 16 may be used for a CRC check that the error correction decoding has succeeded, and the remaining 3 to 7 bits can be used for, at present, unspecified purposes. Thus, the MIN can be decoded bit by bit first of all, and the decoding can be terminated as soon as it is clear a match to the expected MIN will not occur, thus saving power. The sleep-mode group to which a particular slot belong has to be identified somehow. This frame marking is provided in the above by the CDVCC field. This 12-bit field contains one of 32 coded bit patterns corresponding to which of the 32 sleep-modes the mobile station is in.

The above format can, for example, implement two alternate levels of coding, half rate, for "First Try" calls and quarter rate (as per FACCH) for second try calls. In the first case, two calls to two mobiles may be packed in the same burst to save paging capacity.

Figure 3:
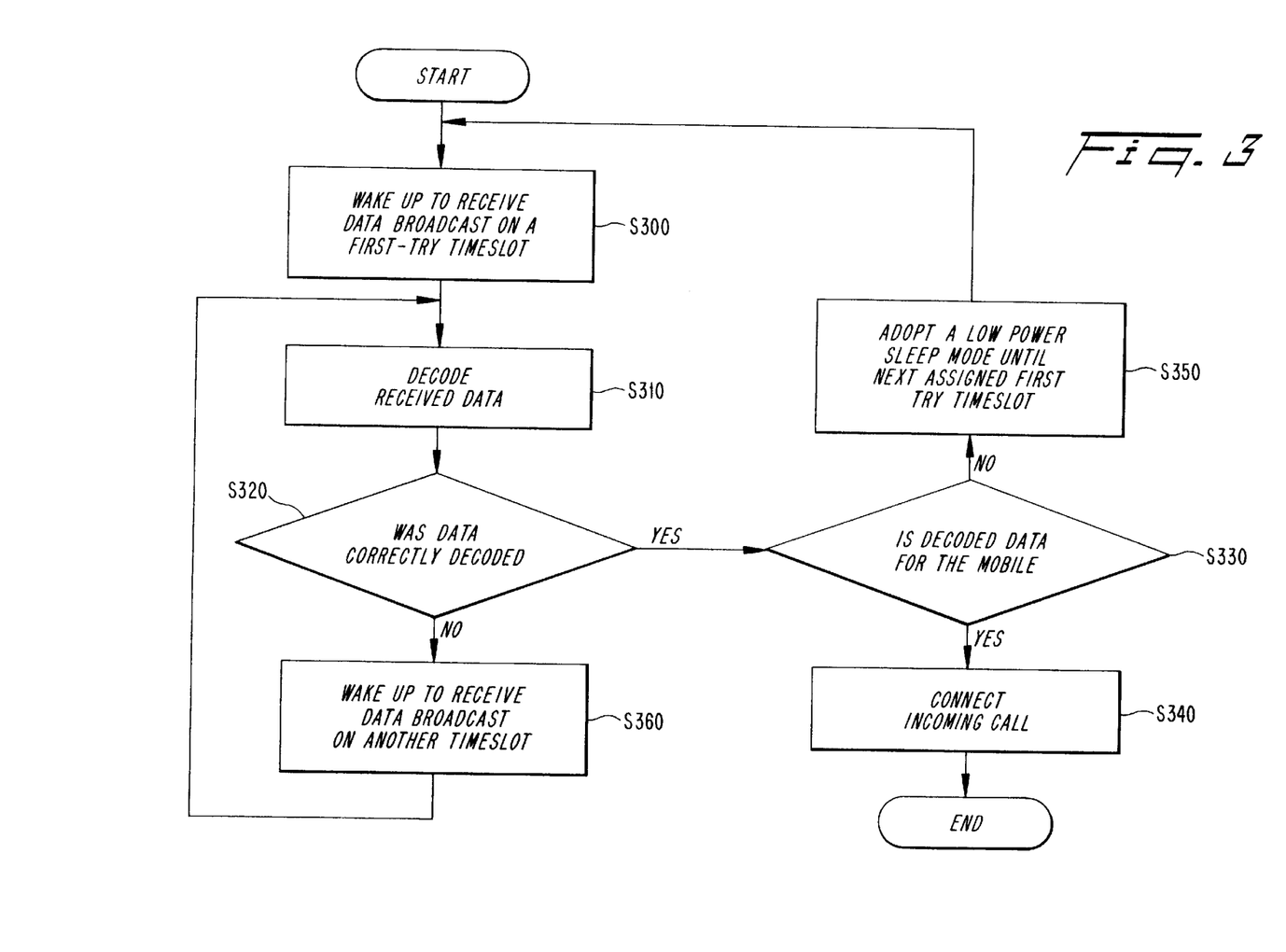
FIG. 3 is a flow chart representation of another embodiment of the present invention.

A method for paging a mobile phone according to another embodiment of the present invention will now be described in conjunction with FIG. 3. A mobile phone wakes up to receive data broadcast only in its assigned first try sleep mode time slot in step S300. The mobile phone then decodes the received data in step S310. The calls broadcasted on the first try slot according to this embodiment of the present invention contain limited error correction coding but enough error detection bits, for example, in the form of a cyclic redundancy check code (CRC), to determine if a call has been received correctly. If it is determined in step S320 that the call has been correctly decoded, and it is determined in step S330 that the data is intended for the mobile station, the system connects the call to the mobile station in step S340.

However, if it is determined in step S330 that the data is not for the mobile phone, the mobile phone adopts a low power sleep mode until its next assigned first try time slot in step S350. On the other hand, if the received data is not correctly decoded in step S320, the failure of the mobile phone to reply to the call signal causes the network to repeat the call on a second try channel after a predetermined delay. Accordingly, the mobile phone wakes up in step S360 to receive a second time slot in which the second tries are broadcast using perhaps more error correction coding.

If the second try call is not for the mobile in question, and a call for the mobile station is subsequently broadcast on the first try channel while the mobile is listening to the second try channel, it is desirable for the mobile in this state to continue to receive and decode data received on both the first and second try channels. This takes more energy from the battery, but only for the percentage of time the mobile is in the state of receiving and decoding two time slots. The state is terminated either by the mobile correctly receiving a second try call in the expected time slot which is not specifically addressed to it, or by failure to receive a second try call after a certain period of time, in which case the mobile reverts to listening only to the first try channel.

Figure 6:
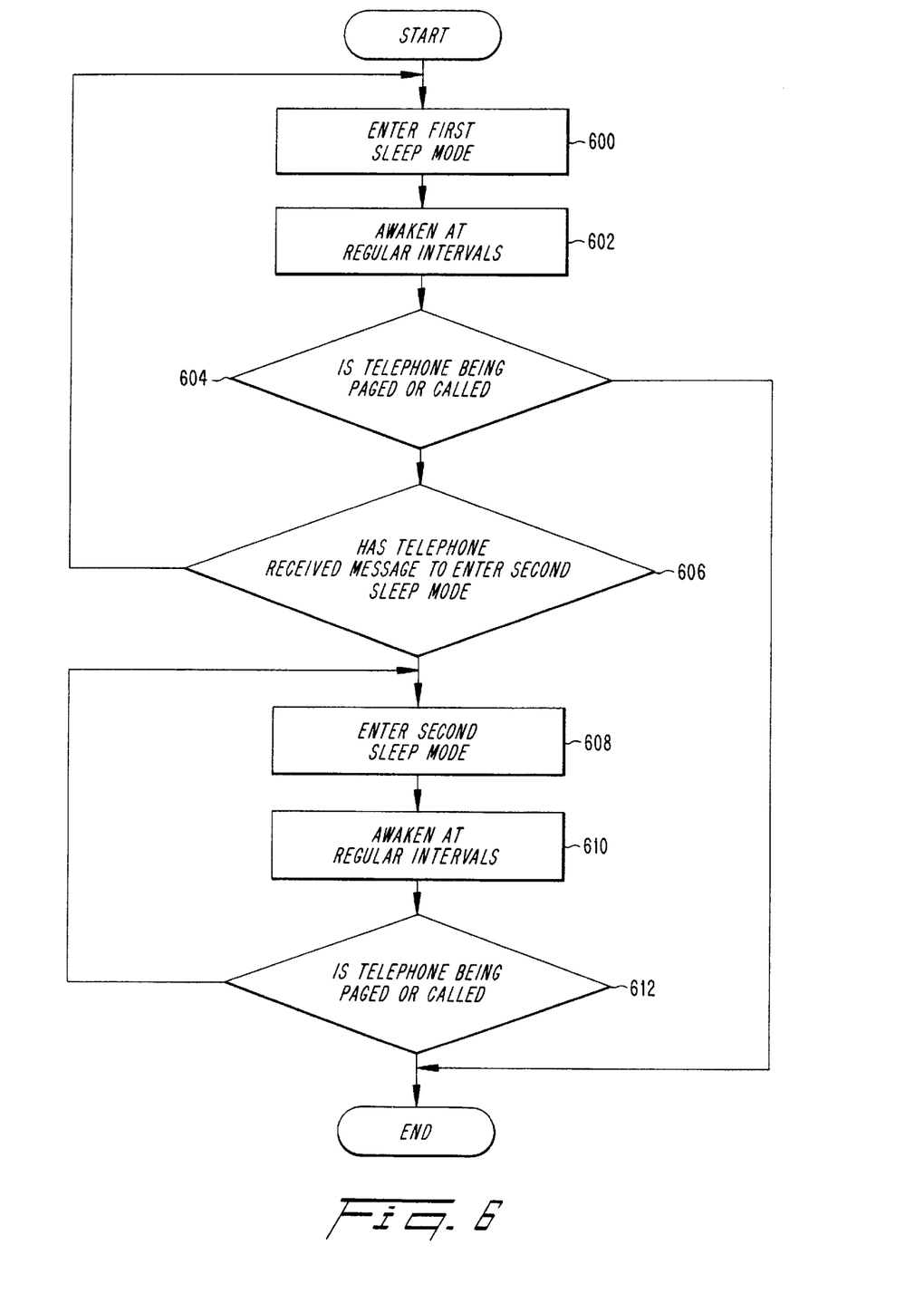
FIG. 6 is a flow chart representation of one embodiment of the present invention.

In another embodiment of the present invention, the portable telephones can enter a plurality of sleep modes in order to conserve battery power. For example, as illustrated in FIG. 6, a portable telephone enters a first low power sleep mode during periods of normal expected use, in step 600. The portable telephone then awakens from the first sleep mode at regular intervals, in step 602, to listen to see if the portable telephone is being paged or called. If it is determined in step 604 that the portable telephone is being paged or called, the portable telephone responds to the page or call. However, if it is determined in step 604 that the portable telephone is not being paged or called, the portable telephone determines if it has received a signal from the communication system requesting the portable telephone to enter a second sleep mode in step 606. If the portable telephone has not received such a request, the portable telephone re-enters the first sleep mode. However, if the portable telephone receives the request message, the portable telephone enters the second sleep mode in step 608, which consumes less power than the first sleep mode. In the second sleep mode, the network transmits paging messages for a particular mobile sleep mode group with a greater time interval between, and mobiles thus sleep for longer intervals between waking periods, conserving more power. This would typically be employed in non-peak periods where rapid response to calls is not needed.

In the present embodiment, the first and second sleep modes are entered depending on whether the mobile phone is in a period of normal use or reduced use. For example, the first sleep mode, in which the mobile phone wakes up more frequently to sample the paging/calling channel, can be automatically entered between 8 am and 8 pm, as determined by a built-in clock or by indication from the system in the broadcast information.

Alternatively, the mobile phone can adopt the first or second sleep mode according to the amount of time that has elapsed since its last call. If a call is made or received, the mobile phone can be triggered to adopt the first sleep mode in which the mobile phone responds more quickly to calls but at the expense of higher battery consumption. When a call is completed, a time-out period begins. If the mobile phone remains inactive for the duration of the time-out period the mobile phone adopts the second sleep mode. In order for mobile phones to autonomously be able to adopt one of the sleep modes without notifying the system of their new duty factor, the transmission format from the system must either permit reception of paging messages by mobile phones in either the first or second sleep mode, or it must itself mirror the behavior of the phone in response to periods of inactivity by that mobile phone. An example of a suitable fixed format would be to repeat paging calls N times 640 ms apart, or until answered by the paged mobile phone. The value of N could be varied by the system and indicated to mobiles in the broadcast information.

Figure 7:
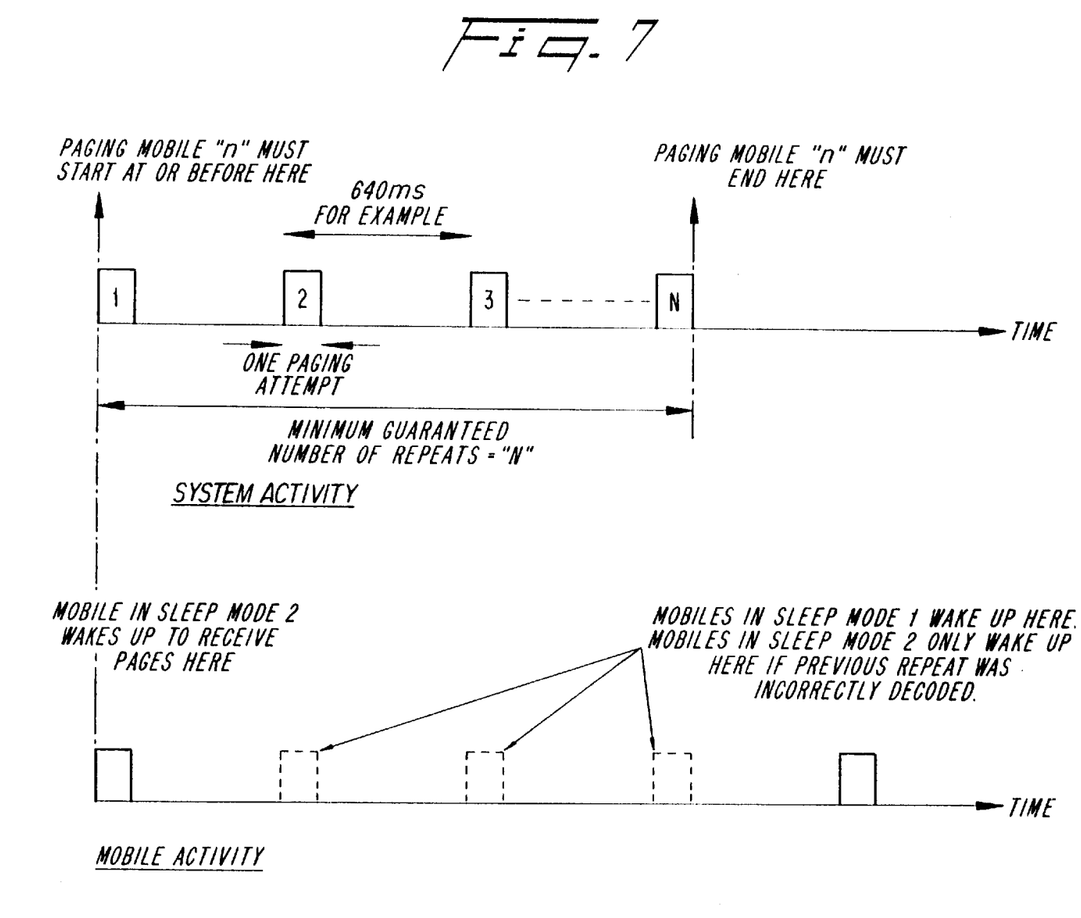
FIG. 7 illustrates a sleep mode activity diagram according to one embodiment of the present invention.
Figure 8:
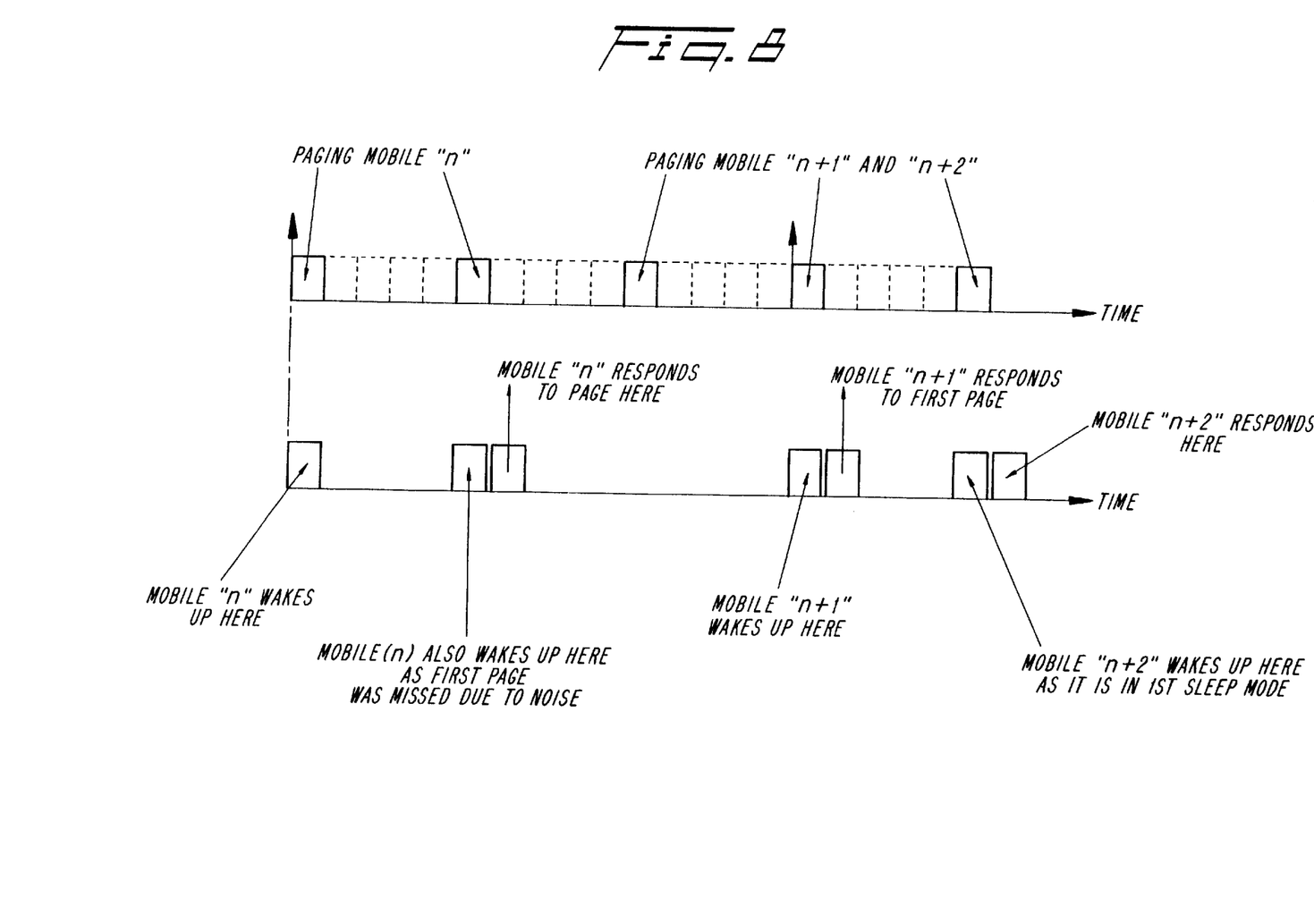
FIG. 8 illustrates system activity having two sleep modes according to one embodiment of the present invention.

The first sleep mode can comprise a mobile phone waking up to receive each message in its designated sleep mode slot, while the second sleep mode can comprise waking up to receive only 1 out of the N repeats. Ideally, the repeat which the mobile in the second sleep mode should aim to wake up to receive is the first repeat, so that other repeats will still be available if the first repeat is not decoded correctly. This is only possible if a block of N repeats always begins at a known position (every Nth sleep-mode slot belonging to the sleep-mode group in question), but this delays the transmission of a page for a mobile in the first sleep mode. This disadvantage however may be unimportant at night, hence the system can vary N between night and day or alternatively keep a list of mobiles known to be using the first or second sleep modes. Other alternatives exist, such as always starting a page at the earliest opportunity on the assumption that the mobile phone in question may be in the first sleep mode and will respond quickly, but always terminating the page repetitions only after a mobile in the second sleep mode would have woken to receive them. This is illustrated in FIGS. 7 and 8.

The portable telephone awakens at regular intervals, in step 610, to determine if the portable telephone is being called or paged. However, the interval between waking up from the second sleep mode is longer than the interval between waking up in the first sleep mode. Finally, if the portable telephone is not being called or paged, the portable telephone re-enters the second sleep mode in step 612.

It will be appreciated that the present invention can obviously and advantageously be extended to include any number of third try, fourth try, etc. channels which can if desired employ progressively increasing amounts of error correction coding for the progressively diminishing number of repeats that they broadcast, thus enabling mobiles that have disadvantageous signal-to-noise conditions to have a chance of at least being notified of a call. To match the increasing coding on these fall-back channels, it can be mentioned that the mobile should appropriately respond to a received call by using a matching amount of coding or increased power or energy in its response. In some cases, the signal-to-noise ratio may be deemed too low to set up a real time voice channel and the calling subscriber can be invited to submit a short voice or data message that is gradually transferred into the called mobile's memory using sufficient amounts of error correction coding, from where the called subscriber can replay or display the short message. In other cases, the signal-to-noise ratio may be sufficient at least to set up a real time voice connection but using a reduced bit rate voice coding technique of reduced signal quality, if that is deemed better than rejecting the call altogether.

Increased energy can be obtained by transmitting the same power for a longer time, such as by using two or more TDMA timeslots instead of one to send the reply. This can be used to accommodate the desired higher amount of redundant coding.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method for saving battery power in a portable telephone for use in a radio communication system having battery-saving sleep modes, comprising the steps of:

repeating transmissions of calling messages from a base station to the portable telephone a guaranteed number of times;

operating the portable telephone in a first low-power sleep mode during periods of normal expected use;

waking the portable telephone in said first sleep mode at regular intervals to receive signals from the communication system;

operating the portable telephone in a second lower-power sleep mode during periods of low expected use; and waking the portable telephone in said second sleep mode less frequently than in said first sleep mode and in relation to the guaranteed number of times transmissions of calling messages are repeated in said step of repeating.

2. A method according to claim 1, wherein said second sleep-mode is only entered after the communication system transmits a signal indicating that the portable telephone should enter the second sleep mode.

3. A method according to claim 1, wherein said periods of low expected use are determined by a time-of-day clock.

4. A method according to claim 3, wherein said time-of-day clock is included in said telephone.

5. A method according to claim 3, wherein said time-of-day clock is broadcast by said radio communications system.

6. A method according to claim 1, wherein said periods of low expected use are determined by time since last call.

7. A method according to claim 6, wherein said time since last call is measured using a timer built into said portable telephone.

8. A method according to claim 1, further comprising the steps of:

monitoring activity by computing a cumulative activity value;

increasing said cumulative activity value whenever a call is placed or received;

gradually decreasing said cumulative activity value whenever said phone is not being used for conversation; and placing said telephone in said first or second sleep mode depending on said cumulative activity value.

9. A communications system for paging mobile phones comprising:

means for monitoring activity of each mobile phone in the system by computing an associated cumulative activity value;

means for increasing said cumulative activity value whenever a call is placed or received from the associated phone;

means for gradually decreasing said cumulative activity value whenever the associated phone is not being used for conversation; and means for transmitting paging messages to mobile phones using, for each phone called, a guaranteed number of repeat transmissions depending on the mobile phone's associated cumulative activity value.

10. A communications system according to claim 9, further comprising:

means for terminating repetition of a paging call upon receipt of a reply from the called mobile.

11. A communications system according to claim 10, further comprising:

means for starting to page a new mobile early when the number of repeat calls to a previously paged mobile is truncated by a receipt of a reply from said previously paged mobile.

12. A communications system according to claim 11, further comprising:

means for extending the number of repeats used for paging said new mobile such that in the event of no reply said repeats always terminate at the same determined power in the paging transmission.

13. A mobile radio telephone system comprising at least one base station transmitting information to portable telephones indicating whether a portable telephone is being called, comprising:

means for dividing a repetitive frame period into a number of communication slots;

means for determining the communication slot to be used for transmitting a call to a portable telephone based on the portable telephone's telephone number or ID;

means for transmitting a calling message in said determined communication slot indicative of the portable telephone being called;

means for repeating transmission of said calling message a number of times as determined by system loading and available capacity to transmit such calls; and means for transmitting an indication of a current guaranteed number of calling message repeats;

wherein said portable telephone uses said indication of a current guaranteed number of calling message repeats to determine the length of the sleep mode to enter.

14. The mobile radio telephone system according to claim 13, wherein said frame includes a frame marker for identifying slot one and subsequent slots in said frame.

15. The mobile radio telephone system according to claim 14, wherein said frame marker is another timeslot used for broadcasting information to all portable telephones in the mobile radio telephone system.

16. The mobile radio telephone system according to claim 15, wherein said broadcast information includes details of surrounding base stations used for transmitting calls.

17. The mobile radio telephone system according to claim 14, wherein said broadcast information includes an infrequently changed random number used in an authentication algorithm to verify authenticity of mobile phones attempting to communicate with the system.

18. The mobile radio telephone system according to claim 13, wherein said base station transmission occupies one timeslot of a Time Division Multiplexed transmission and the other timeslots contain traffic signals to subscribers engaged in conversation.

19. A method for paging a mobile phone in a radiotelephone system having a plurality of mobile phones wherein said mobile phones are in a reduced power sleep mode when they are idle, comprising the steps of:

waking up at assigned intervals to receive data which is broadcast on an assigned first try sleep mode time slot;

decoding said received data;

adopting a low power sleep mode until next assigned first try sleep mode time slot when correctly decoded data is for another mobile phone; and waking up to receive data broadcast on a second try time slot when said first data is not correctly decoded, wherein data broadcast on said second try time slot are broadcasted using at least one of a) an increased amount of error correction coding, b) a higher broadcast power level and c) a wider broadcast area as compared to data broadcast on said first try time slot.

20. A method for paging a mobile phone in a radiotelephone system according to claim 19, wherein said mobile phone continues to wake up for data broadcast on said first try time slot while also listening for data broadcasts on said second time slot.

21. A method for paging a mobile phone in a radiotelephone system according to claim 19, further comprising the step of:

waking up for only said first try time slot when the mobile phone correctly receives a second try call which is for another mobile phone.

22. A method for paging a mobile phone in a radiotelephone system according to claim 19, further comprising the step of:

waking up for only said first try time slot when the mobile phone fails to receive a second try call after a third predetermined period of time.

23. A portable wireless telephone having an idle mode and a reduced power idle mode to conserve power, comprising:

receiver/decoder means to receive and decode paging messages broadcast using a guaranteed number of message repetitions by a mobile phone system in a repetitive paging timeslot assigned to a group of mobile phones and also to identify said guaranteed number; and control unit means connected to said receiver/decoder means responsive to said guaranteed number and to said decoded paging messages to place said receiver/decoder circuits in a low power condition according to a first or second idle-mode schedule.

24. A portable phone according to claim 23, wherein said first or second idle mode schedule is selected by said control unit depending upon time since receipt of the last paging message addressed to said phone or to the time since said phone was used to initiate a call.

25. A portable phone according to claim 23, wherein said second idle mode comprises powering up said receiver/decoder to receive every Nth message on said phone's designated paging slot where N is equal to said first number.

26. A portable phone according to claim 25, wherein said receiver/decoder means after walking up to receive a paging message is in said second idle mode also powered up to receive following message repeats if said message was not decoded correctly on a first or previous repeat.

27. A portable phone according to claim 23, wherein said control unit means in said first idle mode powers up said receiver/decoder to receive every message repeat on its assigned paging timeslot.

28. A portable telephone according to claim 23, wherein said control unit causes said receiver/decoder means to wake up to receive all paging message repeats during the first idle-mode schedule and wherein said control unit causes said receiver/decoder means to wake up to receive every Nth message transmitted on a designated sleep mode slot during the second idle-mode schedule, wherein N is equal to the guaranteed number.

* * * * *